(12) United States Patent
Ainspan et al.

(10) Patent No.: US 7,205,816 B2
(45) Date of Patent: Apr. 17, 2007

(54) VARIABLE-GAIN-AMPLIFIER BASED LIMITER TO REMOVE AMPLITUDE MODULATION FROM A VCO OUTPUT

(75) Inventors: Herschel A. Ainspan, New Hempstead, NY (US); Gautam Gangasani, Hopewell Junction, NY (US); Louis C. Hsu, Fishkill, NY (US); Jack A. Mandelman, Flat Rock, NC (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 11/155,848

(22) Filed: Jun. 17, 2005

(65) Prior Publication Data

US 2007/0001736 A1 Jan. 4, 2007

(51) Int. Cl.
*H03K 3/00* (2006.01)
*G06G 7/12* (2006.01)

(52) U.S. Cl. .................. 327/291; 327/561; 327/156

(58) Field of Classification Search ........ 327/156–159, 327/147, 560–561, 291
See application file for complete search history.

(56) References Cited

U.S. PATENT DOCUMENTS

| | | | | |
|---|---|---|---|---|
| 5,189,362 A | * | 2/1993 | Doble | 324/106 |
| 5,850,357 A | * | 12/1998 | Shefer | 708/819 |
| 6,094,158 A | * | 7/2000 | Williams | 342/70 |

* cited by examiner

*Primary Examiner*—Dinh T. Le
(74) *Attorney, Agent, or Firm*—Scully, Scott, Murphy & Presser, P.C.; Joseph P. Abate, Esq.

(57) ABSTRACT

An apparatus and method for generating high-speed clock signals using a voltage-controlled-oscillator (VCO) device. The apparatus implements a linear variable gain amplifier rather than a non-linear hard limiter to remove unwanted signal modulation in VCO output signals. Implementation of the linear variable gain amplifier leads to the generation of amplitude modulation-free oscillation leading to the generation of jitter free high frequency clock signals.

20 Claims, 3 Drawing Sheets

VARIABLE-GAIN-AMPLIFIER BASED LIMITER TO REMOVE AMPLITUDE MODULATION FROM A VCO OUTPUT

BACKGROUND

1. Field of the Invention

The present invention relates to the generation of high-speed clock signals using a voltage-controlled-oscillator (VCO) circuit and more particularly, to the use of a linear variable gain amplifier rather than a non-linear hard limiter to remove unwanted signal modulation in VCO output signals.

2. Description of the Prior Art

Voltage-controlled-oscillator (VCO) circuits are typically used to deliver signals that are modified to be used as clock signals for timing and control in an integrated circuit. As an example, phase-locked loop (PLL) circuits often employ a VCO to provide the clocking means. Many current VCO circuit designs provide VCO output signals that exhibit low frequency amplitude modulations. One such cause for amplitude modulation at the VCO output is tail current modulation which could have many sources. For example, all differential circuits have tail devices supplying current. These tail devices on the other hand refer to reference devices for their current multiplication and these reference devices on the other hand, refer to op-amp stabilized current sources. If there is some instability in these operational amplifier devices, one could have a cascade effect, which could manipulate itself as tail current modulation.

An exaggerated example of amplitude modulation, due to tail current modulation is shown in FIG. 1 which illustrates an example VCO output signal 10 provided at an output of an amplitude detection device (not shown). The example VCO output signal 10 depicted, includes a carrier waveform of 1 GHz. As further shown in FIG. 1, the high frequency carrier is periodically amplitude modulated.

Prior to being used as a clock signal, this kind of amplitude modulation needs to be removed from the system or circuit in which the VCO is implemented.

While most common VCO design concentrate on the provision of a hard limiter designed to suppress amplitude modulation (AM), if a sinusoidal input is supplied and the limiter has a linear transfer curve, then the output is sinusoidal. At large input amplitudes, the limiter cuts off the peaks of the sine wave. These waveforms exhibit different zero-crossing delays when fed through a circuit of finite bandwidth. This leads to amplitude-modulation-pulse width modulation (AM-PM) conversion. It is very hard to establish a low AM-PM conversion with a hard limiter, and this is only established at high bandwidth-to-input frequency ratios, which come at the expense of considerable power dissipation. This kind of PM leads to deterministic jitter that must be avoided in clock signals.

SUMMARY OF THE INVENTION

It is thus an object of the invention to provide a system and method for processing VCO output signals used in the generation of clock signals in electronic devices, e.g., circuits, integrated circuits, etc. that removes unwanted amplitude modulation without generating pulse width modulation in the VCO output signals which results in the improved generation of jitter-free clock signals.

According to the invention, there is provided implementation of a form of variable gain amplifier that removes amplitude modulation from VCO output signals without generating pulse width modulation in the VCO output signals.

Thus, according to one aspect of the invention, there is provided an apparatus and method for removing low frequency amplitude modulation component of an oscillation signal comprising:

an operational amplifier means for receiving an oscillation signal having the low frequency modulation component at one input, and a feedback path connecting an output of the operation amplifier with the one input;

a means for generating a signal representing the low frequency amplitude modulation component of the oscillation signal; and, a linear amplifier device located in the feedback path between the operational amplifier output and the one input for multiplying the signal representing the low frequency amplitude modulation component with a signal at the operational amplifier output, wherein the operational amplifier produces an output signal comprising the oscillation signal without the low frequency amplitude modulation.

According to this aspect of the invention, the linear amplifier device located in the feedback path comprises a highly linear Gilbert cell multiplier.

Advantageously, the apparatus and method implementing a variable gain amplifier of the present invention for controlling VCO output signals may be included in those integrated circuits, systems and devices used in the production of jitter free clock signals in the GHz frequency range.

DETAILED DESCRIPTION OF THE INVENTION

The above-described AM-PM conversion originates from waveform changes which, according to the invention, are eliminated by inputting the VCO output signals into a linear variable gain amplifier device designed to remove AM instead of a nonlinear hard limiter as used in the prior art. An exemplary circuit diagram of the linear variable gain amplifier device implementation is shown in FIG. 2.

Figure 1:
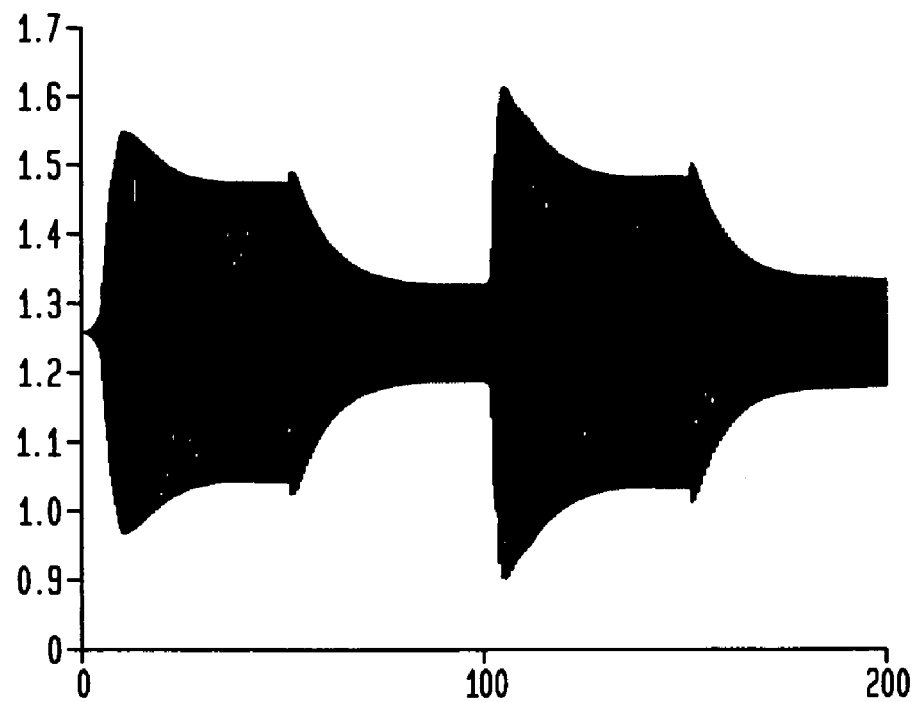
FIG. 1 illustrates an exaggerated example of a VCO output signal exhibiting an amplitude modulation, e.g., due to tail current modulation in a VCO circuit according to prior art designs.
Figure 2:
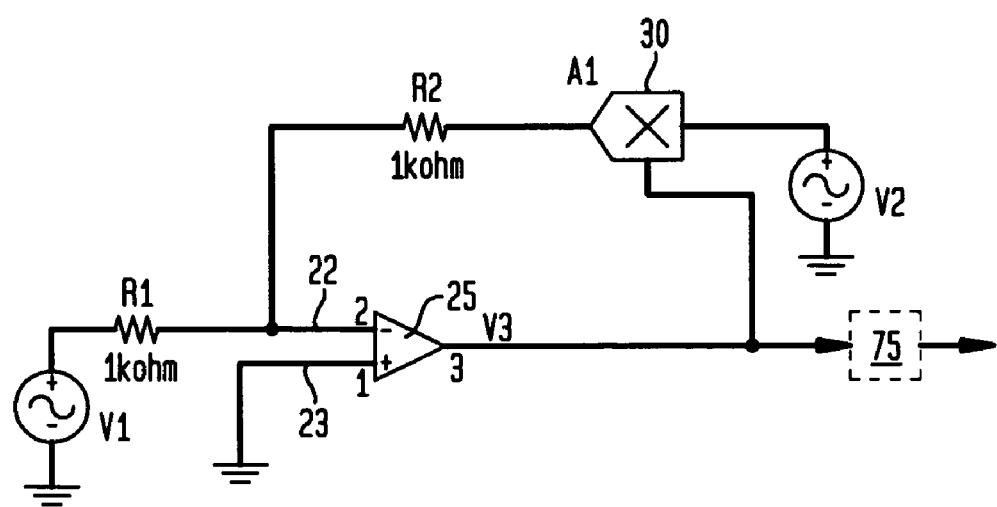
FIG. 2 illustrates the novel linear variable gain amplifier designed to remove AM from VCO output signals according to the invention.

FIG. 2 illustrates an exemplary circuit diagram 20 for achieving VCO output signal demodulation scheme employing a linear variable gain amplifier device according to the invention. As shown in FIG. 2, V1 is the VCO signal output having the carrier signal $V_a \sin(2\pi f_c t)$ where $V_a$ is the peak amplitude and $f_C$ is the carrier frequency, in addition to the modulation information $\sin(2\pi f_m t)$ where $f_m$ is the modulation frequency. The signal V1 thus may be represented mathematically, for example, as a signal $V_a \sin(2\pi f_c t)\sin(2\pi f_m t)$ and is input to a negative input terminal 22 of operational amplifier (op-amp) 25. The positive terminal 23 of op-amp 25 is shown connected to a ground. The output of the op-amp 25, signal V3, is input to a mixer device 30 such as a MOS Gilbert multiplier cell configured as a mixer device having high linearity and yielding linear products of both inputs (e.g., when configured in a double balanced mixer topology well-known to skilled artisans). A representative MOS Gilbert cell design may be found in commonly-owned U.S. Pat. No. 5,872,446, the whole disclosure and contents of which, including the references cited therein, being herein incorporated by reference as if fully set forth herein. Additionally, input to the Gilbert cell device 30 is a voltage V2 corresponding to the waveform of modulation of the modulated carrier signal V1 and represented mathematically, for example, by $V_m \sin(2\pi f_m t)$, where $V_m$ is the peak amplitude. It is understood that the Gilbert cell device 30 multiplies the inputs with a unity gain, and, the op-amp device may be programmed with a unity gain if the resistor ratio R2/R1 is unity as shown in FIG. 2. However, the circuit of FIG. 2 functions as a variable gain amplifier as the use of an op-amp in a negative feedback configuration in the topology shown in FIG. 2 provides the variable gain amplifier characteristic.

Assuming generally the Gilbert cell device 30 multiplies the inputs with a unity gain (gain of 1) then the output V3 of the ideal op-amp in FIG. 2 is given by equation 1) as follows:

$$V3 = \frac{-V_a \sin(2\pi f_c t)\sin(2\pi f_m t)}{V_m \sin(2\pi f_m t)} \quad 1)$$

where the modulated carrier waveform is V1, the modulation information is contained in V2, and Va and Vm are the peak amplitudes of their respective signals, V1 and V2. As can be seen, the waveform V3 is demodulated and the pure carrier waveform component is obtained. That is, due to the variable gain configuration of the op-amp device 25 in negative feedback configuration, V3 is produced in the expression given in equation 1 where the $\sin(2\pi f_m t)$ terms in the numerator and denominator get cancelled leaving just the carrier waveform of $\sin(2\pi f_c t)$. This concept is verified and output waveforms plotted in FIG. 3 which depicts: the modulated carrier waveform, i.e., the V1 signal waveform 50, the V2 signal waveform 51; and, lastly, the V3 signal waveform 52 which exhibits no modulation. Referring back to FIG. 2, this demodulated waveform V3 may be input to a circuit 75 that is used in the production of jitter free clock signals for integrated circuit devices. For example, such a circuit 75 may include a hard limiter device as the input signal (V3) does not have any AM-PM modulation. As there is no AM-PM modulation, jitter in the limiter device is virtually non-existent.

Figure 3:
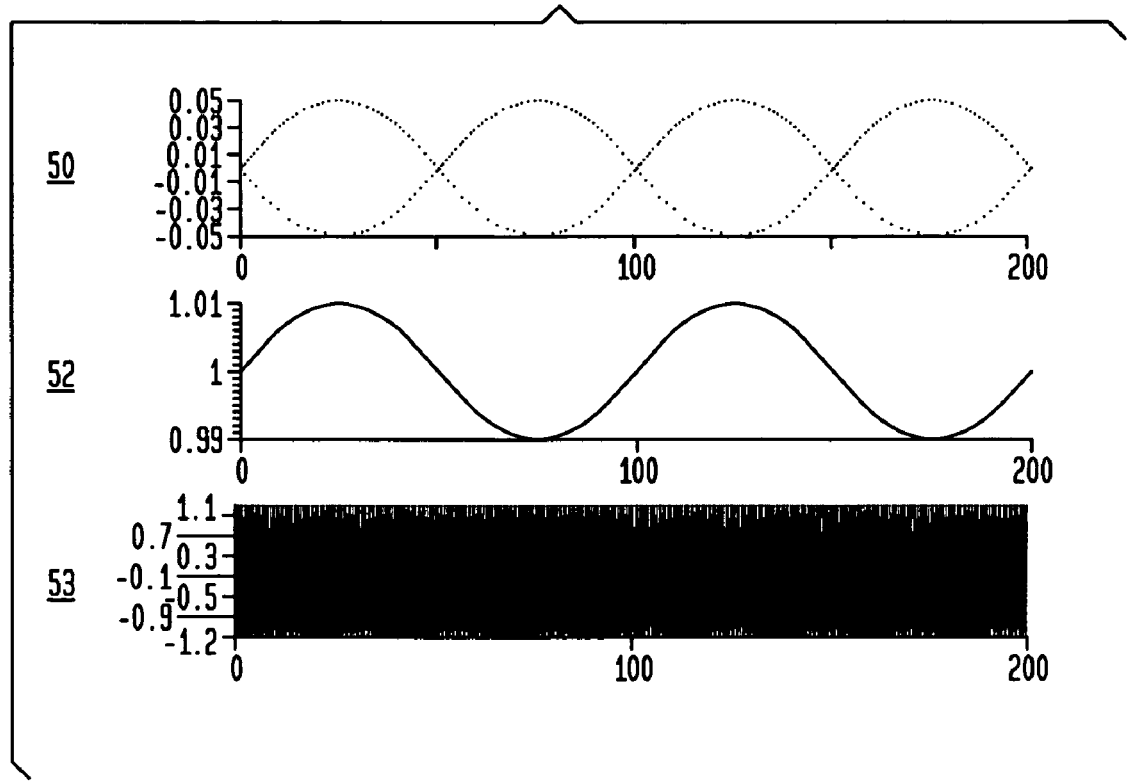
FIG. 3 illustrates a plot of waveforms including the modulated carrier waveform (V1 signal of FIG. 2), the modulation envelop waveform (V2 signal of FIG. 2); and, lastly, the waveform V3, which exhibits no modulation.
Figure 4:
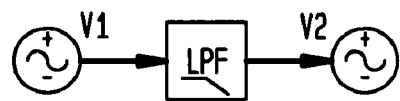
FIG. 4 illustrates a technique for obtaining the modulation (envelop) waveform V2, as shown in FIGS. 2 and 3; and, FIG. 5 illustrates a technique for obtaining the modulation (envelop) waveform V2, generated for input to the linear variable gain amplifier as shown in FIG. 2.

FIG. 4 illustrates a technique for obtaining the modulation (envelop) waveform V2, as shown in FIGS. 2 and 3. Particularly, by passing the modulating carrier waveform signal V1 through a low pass filter device 60, as shown in FIG. 4, the envelope of the modulation is obtained.

Figure 5:
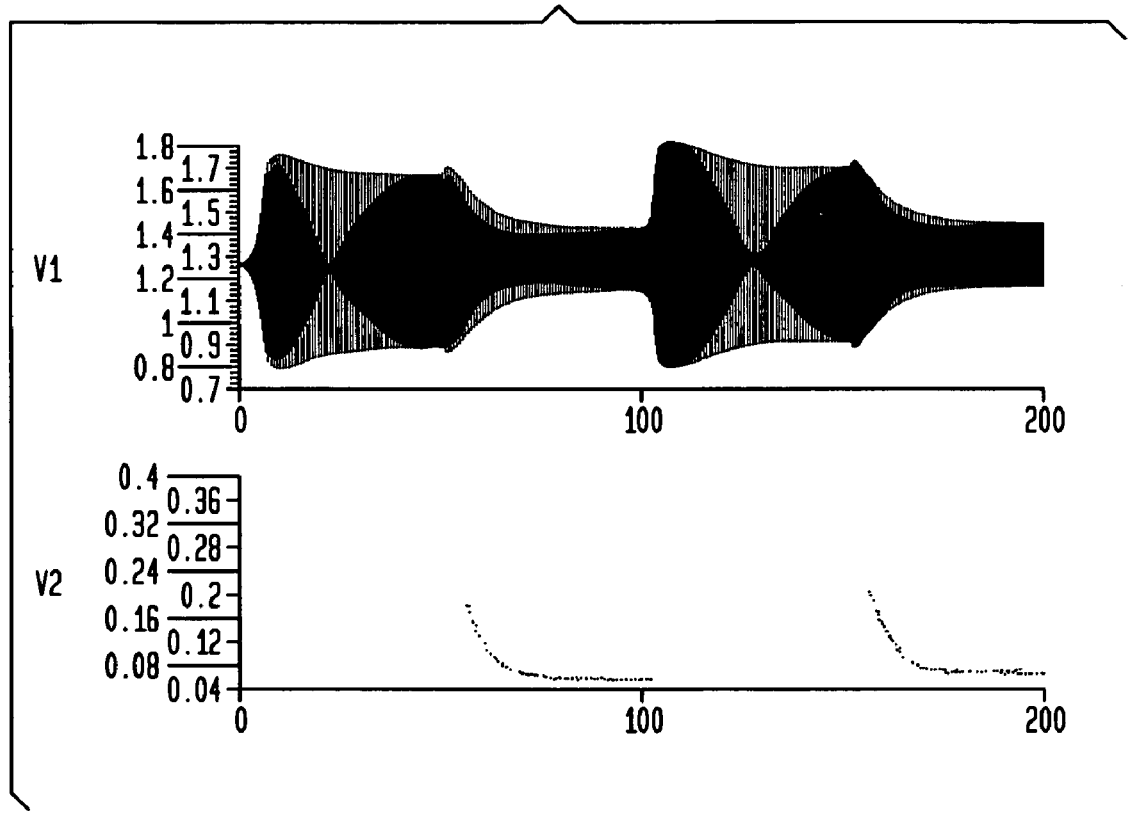

FIG. 5 depicts a plot of an example modulated carrier waveform V1 and the output envelop of the modulation V2 obtained after the waveform V1 is passed through a low pass filter device 60 of FIG. 4. Using these two waveforms, the MOS Gilbert cell 30 and the op-amp device 25 configured as a variable gain amplifier circuit in accordance with the circuit shown in FIG. 2 provide a clean carrier signal V3 that enables the generation of jitter free digital clock signals for integrated circuits.

It should be understood that there may be a different periodic function doing the modulation, however, the concept of demodulation once the envelope of the modulation is available, is contemplated according to the invention.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. An apparatus for removing low frequency amplitude modulation component of an oscillation signal comprising:
    an operational amplifier means for receiving an oscillation signal having said low frequency modulation component at one input, and a feedback path connecting an output of said operation amplifier with said one input;
    means for generating a signal having a waveform corresponding to said low frequency amplitude modulation component of said oscillation signal;
    a linear amplifier device located in said feedback path between said operational amplifier output and said one input for multiplying said signal representing said low frequency amplitude modulation component with a signal at said operational amplifier output, wherein said operational amplifier produces an output signal comprising the oscillation signal without the low frequency amplitude modulation.

2. The apparatus as claimed in claim 1, wherein said oscillation signal having said low frequency modulation component is generated from a voltage controlled oscillator (VCO) device.

3. The apparatus as claimed in claim 2, further comprising means for generating clock signals from said operational amplifier output signal, said generated clock signals being substantially jitter free.

4. The apparatus as claimed in claim 3, wherein said means for generating substantially jitter free clock signals from said operational amplifier output signal include a hard limiter device.

5. The apparatus as claimed in claim 1, wherein said means for generating a signal representing said low frequency amplitude modulation component of said oscillation signal comprises a low pass filter, said low pass filter receiving said oscillation signal and outputting said signal representing said low frequency amplitude modulation component.

6. The apparatus as claimed in claim 1, wherein said linear amplifier device located in said feedback path comprises a Gilbert cell multiplier.

7. The apparatus as claimed in claim 1, wherein said Gilbert cell multiplier operates in a unity gain configuration.

8. The apparatus as claimed in claim 1, wherein said operational amplifier operates in a unity gain, negative feedback configuration.

9. The apparatus as claimed in claim 1, wherein said oscillation signal is represented as a signal $V1=V_a \sin(2\pi f_c t) \sin(2\pi f_m t)$ where $f_c$ is a carrier frequency, and said low frequency amplitude modulation component is represented as a signal $V2=\sin(2\pi f_m t)$ where $f_m$ is a modulation frequency, wherein said operational amplifier output signal is represented as a signal V3 governed according to:

$$V3 = \frac{-V_a \sin(2\pi f_c t)\sin(2\pi f_m t)}{V_m \sin(2\pi f_m t)}$$

where $V_a$ and Vm are respective peak amplitudes of signals V1 and V2.

10. The apparatus as claimed in claim 9, wherein said $f_c$ carrier frequency is in a GHz range.

11. The apparatus as claimed in claim 4, wherein said means for generating clock signals from said operational amplifier output signal comprises a phase-locked loop device.

12. An apparatus for generating jitter free digital signals comprising:
   an operational amplifier means for receiving an oscillation signal having a low frequency modulation component at one input, and a feedback path connecting an output of said operation amplifier with said one input;
   means for generating a signal having a waveform corresponding to said low frequency amplitude modulation component of said oscillation signal;
   a linear amplifier device located in said feedback path between said operational amplifier output and said one input for multiplying said signal representing said low frequency amplitude modulation component with an output signal of said operational amplifier, wherein said operational amplifier produces an output signal comprising the oscillation signal without the low frequency amplitude modulation; and,
   means for generating clock signals from said operational amplifier output signal, said generated clock signals being substantially jitter free.

13. The apparatus as claimed in claim 12, wherein said oscillation signal having said low frequency modulation component is generated from a voltage controlled oscillator (VCO) device.

14. The apparatus as claimed in claim 12, wherein said means for generating a signal representing said low frequency amplitude modulation component of said oscillation signal comprises a low pass filter, said low pass filter receiving said oscillation signal and outputting said signal representing said low frequency amplitude modulation component.

15. The apparatus as claimed in claim 12, wherein said linear amplifier device located in said feedback path comprises a Gilbert cell multiplier.

16. The apparatus as claimed in claim 12, wherein said Gilbert cell multiplier operates in a unity gain configuration.

17. The apparatus as claimed in claim 12, wherein said operational amplifier operates in a unity gain, negative feedback configuration.

18. The apparatus as claimed in claim 12, wherein said oscillation signal is represented as a signal V1=$V_a$ sin(2π$f_c$t) sin(2π$f_c$t) where $f_c$ is a carrier frequency, and said low frequency amplitude modulation component is represented as a signal V2=sin(2π$f_m$t) where $f_m$ is a modulation frequency, wherein said operational amplifier output signal is represented as a signal V3 governed according to:

$$V3 = \frac{-V_a \sin(2\pi f_c t)\sin(2\pi f_m t)}{V_m \sin(2\pi f_m t)}$$

where $V_a$ and Vm are respective peak amplitudes of signals V1 and V2.

19. A method for removing low frequency amplitude modulation component of an oscillation signal generated by a voltage controlled oscillator comprising:
   a) providing an operational amplifier means for receiving an oscillation signal having said low frequency modulation component at one input, and having a feedback path connecting an output of said operation amplifier with said one input;
   b) generating a signal having a waveform corresponding to said low frequency amplitude modulation component of said oscillation signal;
   c) providing a linear amplifier device located in said feedback path between said operational amplifier output and said one input for multiplying said signal representing said low frequency amplitude modulation component with a signal at said operational amplifier output, wherein said operational amplifier produces an output signal comprising the oscillation signal without the low frequency amplitude modulation.

20. The method as claimed in claim 19, wherein said generating step b) comprises the steps of inputting said oscillation signal into a low pass filter, said low pass filter generating an output signal having a waveform corresponding to said low frequency amplitude modulation component.

* * * * *